United States Patent
Bloomfield et al.

(10) Patent No.: US 9,019,292 B2
(45) Date of Patent: Apr. 28, 2015

(54) REORDERING GRAPH EXECUTION FOR PROCESSING OPTIMIZATION

(75) Inventors: Jeffrey R. Bloomfield, Bothell, WA (US); Stephen P. Proteau, Bothell, WA (US); Michael Vincent Onepro, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 209 days.

(21) Appl. No.: 13/230,494

(22) Filed: Sep. 12, 2011

(65) Prior Publication Data

US 2013/0063453 A1    Mar. 14, 2013

(51) Int. Cl.
- G06F 13/00 (2006.01)
- G06T 11/40 (2006.01)
- G06F 13/14 (2006.01)

(52) U.S. Cl.
CPC ..................................... G06F 13/14 (2013.01)

(58) Field of Classification Search
CPC ........ G06T 15/004; G06T 1/60; G06T 15/005
USPC ......................................................... 345/552
See application file for complete search history.

(56) References Cited

U.S. PATENT DOCUMENTS

| | | | | |
|---|---|---|---|---|
| 5,852,451 | A * | 12/1998 | Cox et al. | 345/570 |
| 6,657,635 | B1 | 12/2003 | Hutchins | |
| 6,741,255 | B1 * | 5/2004 | Furlani et al. | 345/537 |
| 7,379,599 | B1 * | 5/2008 | Blais-Morin et al. | 382/217 |
| 7,663,633 | B1 | 2/2010 | Diamond | |
| 7,800,610 | B2 | 9/2010 | Bakalash | |
| 2007/0013694 | A1 | 1/2007 | Gold | |
| 2007/0257905 | A1 * | 11/2007 | French et al. | 345/419 |
| 2007/0294682 | A1 * | 12/2007 | Demetriou et al. | 717/153 |
| 2008/0024497 | A1 | 1/2008 | Crow | |
| 2010/0030728 | A1 * | 2/2010 | Chakkappen et al. | 707/2 |
| 2010/0328327 | A1 | 12/2010 | Hervas | |

OTHER PUBLICATIONS

Enrico Kienel and Guido Brunnett "GPU-Accelerated Contour Extraction on Large Images Using Snakes" Published Date: Feb. 2009-## http://www.qucosa.de/fileadmin/data/qucosa/documents/5757/data/CSR-09-02.pdf Proceedings:N/A.

Kun Zhou, et al. "RenderAnts: Interactive REYES Rendering on GPUs" Published Date: Dec. 16, 2009 http://citeseerx.ist.psu.edu/viewdoc/download?doi=10.1.1.159.3602&rep=rep1&type=pdf Proceedings: ACM Siggraph Asia 2009.

"15 Filter Effects" Retrieved Date: Jun. 1, 2011 http://www.w3.org/TR/SVG/filters.html.

\* cited by examiner

*Primary Examiner* — James A Thompson
*Assistant Examiner* — Tapas Mazumder
(74) *Attorney, Agent, or Firm* — Timothy Churna; Peter Taylor; Micky Minhas (57) ABSTRACT

Methods are provided for reordering operations in execution of an effect graph by graphics processing unit. Memory availability is evaluated for storing images rendered using the effect graph. Memory is allocated for multiple parallel intermediate textures that store images. Operations that write to these textures are executed. It is then determined that there is not sufficient memory to perform additional parallel operations. The memory currently allocated is flushed, and memory for an upper-level texture is allocated. The operations that write pixels to the upper-level texture are executed.

20 Claims, 6 Drawing Sheets

REORDERING GRAPH EXECUTION FOR PROCESSING OPTIMIZATION

BACKGROUND

Tile-based graphics processing units (GPUs) have been used to break up rendering of an output bitmap or a render target into smaller regions and separately execute drawing operations to these smaller regions before combining them to produce a final image output. Tile-based GPUs are particularly useful when used in conjunction with devices that have limited memory and bandwidth, as portions of an input image are separately rendered, thus using smaller amounts of memory and bandwidth. Flushing operations that occur during execution of an effect graph can be expensive. Avoiding flushes during the performance of general image processing operations on the GPU, however, can be difficult, as the GPU typically issues a flush each time a render target is switched.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to limiting the quantity of flushes that occur during execution of an effect graph based on one or more factors. For instance, determine that the total memory available can store a first texture and a second texture, but not a third texture, may limit the quantity of flushes that occur. An effect graph may comprise a plurality of intermediate textures, an upper-level texture, such as the final texture, and parallel lower-level and upper-level operations that read and write pixels to and from one texture to another. If two or more operations write pixels to a particular texture, embodiments of the present invention provide for deferring execution of these operations until as many operations can execute sequentially such that the texture to which the operations write can be allocated in memory and set as a render target less times than the quantity of operations that directly write to that texture. Generally, this involves selecting an order of execution of the operations that comprise the effect graph so that the likelihood of flushing is minimized, thus improving performance of the execution of the operation.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to reordering execution of an effect graph to limit the number of flushes that occur during its execution. A flush, in one embodiment, occurs each time a texture is set as a render target, and as such it is desired to render a particular target as few times as possible. To accomplish this, the execution of an operation that writes pixels to a particular texture may be deferred until one or more parallel operations that also write pixels to that particular texture can also be executed so that the texture is allocated to memory and set as a render target once, instead of each time an operation is executed. Various heuristics may be used to determine the order of execution of the deferred operations, and additionally to determine when a memory threshold would be exceed if additional textures are allocated to memory. This process is able to greatly reduce the quantity of flushes that occur, therefore reducing the cost of rendering images.

Accordingly, in one aspect, an embodiment of the present invention is directed to one or more computer storage media having computer-executable instructions embodied thereon, that when executed by a computing system having a processor and memory, cause the computing system to perform a method of reordering operations in execution of an effect graph by a graphics processing unit (GPU). The method includes evaluating available memory for storage of images rendered using the effect graph, allocating memory for two or more parallel intermediate textures, and executing two or more parallel lower-level operations that write pixels to the two or more parallel intermediate textures. Further, the method includes determining that a memory threshold would be exceeded if additional lower-level parallel operations are performed, flushing the allocated memory for the two or more parallel intermediate textures, and allocating memory for an upper-level texture. An image stored in the upper-level texture is rendered using, at least, two or more parallel upper-level operations that read pixels from the images stored in the two or more parallel intermediate textures. The method additionally includes executing the two or more parallel upper-level operations that write pixels to the upper-level texture.

In another embodiment, an aspect is directed to one or more computer storage media having computer-executable instructions embodied thereon, that when executed by a computing system having a processor and memory, cause the computing system to perform a method of reordering operations in execution of an effect graph by a graphics processing unit (GPU). The method includes evaluating available memory for storage of images rendered using the effect graph, allocating memory for two or more parallel intermediate textures, and executing two or more parallel lower-level operations that write pixels to the two or more parallel intermediate textures. Further, the method includes determining that a memory threshold would not be exceeded if additional lower-level parallel operations are performed, allocating memory for additional parallel intermediate textures that are parallel to the two or more parallel intermediate textures, and executing the additional parallel lower-level operations that write pixels to the additional parallel intermediate textures. The method also includes flushing the allocated memory for the two or more parallel intermediate textures and for the additional parallel intermediate textures, and allocating memory for an upper-level texture. An image stored in the upper-level texture is rendered by, at least, two or more parallel upper-level operations that read pixels from the images stored in the two or more parallel intermediate textures and the additional parallel intermediate textures. Additionally, the method includes executing the two or more parallel upper-level operations that write pixels to the upper-level texture.

A further embodiment of the present invention is directed to a method in a computing environment utilizing a processor and memory for reordering operations in execution of an effect graph by a graphics processing unit (GPU). The method includes providing an effect graph comprising a plurality of operations used to render an image and a plurality of textures that store images and a final image, allocating memory for a first texture of two or more parallel textures, and executing a first operation of two or more parallel lower-level operations that writes pixels to the first texture. The method further includes determining that allocating memory for a second texture of the two or more parallel textures would not exceed a threshold of memory usage and allocating memory for the second texture of the two or more parallel textures. Additionally, the method includes executing a second operation of the two or more parallel lower-level operations that writes pixels to the second texture and allocating memory for an upper-level texture that is rendered by two or more parallel upper-level operations that write pixels to the upper-level texture such that the upper-level texture is allocated in memory less times than the quantity of operations comprising the two or more parallel upper-level operations. The method also includes executing the two or more parallel upper-level operations that read pixels from the two or more parallel textures to render an upper-level image stored in the upper-level texture.

Figure 1:
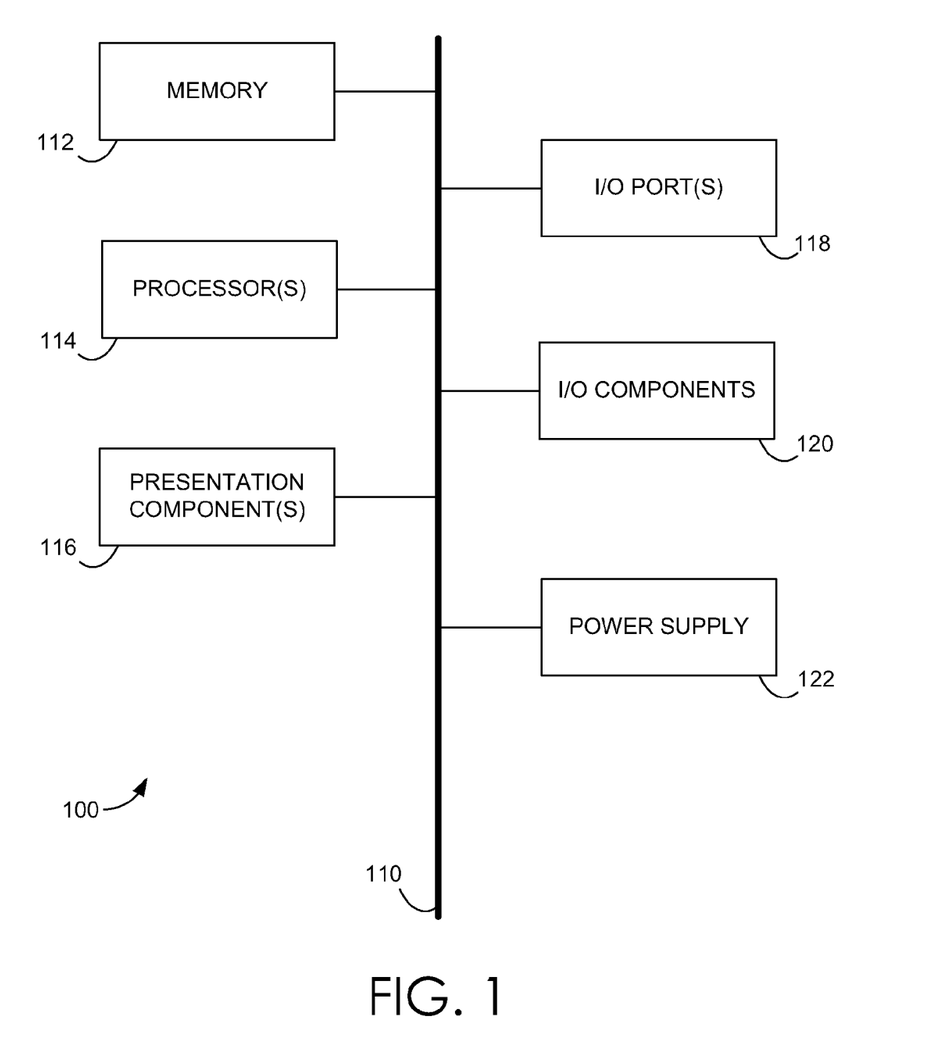
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
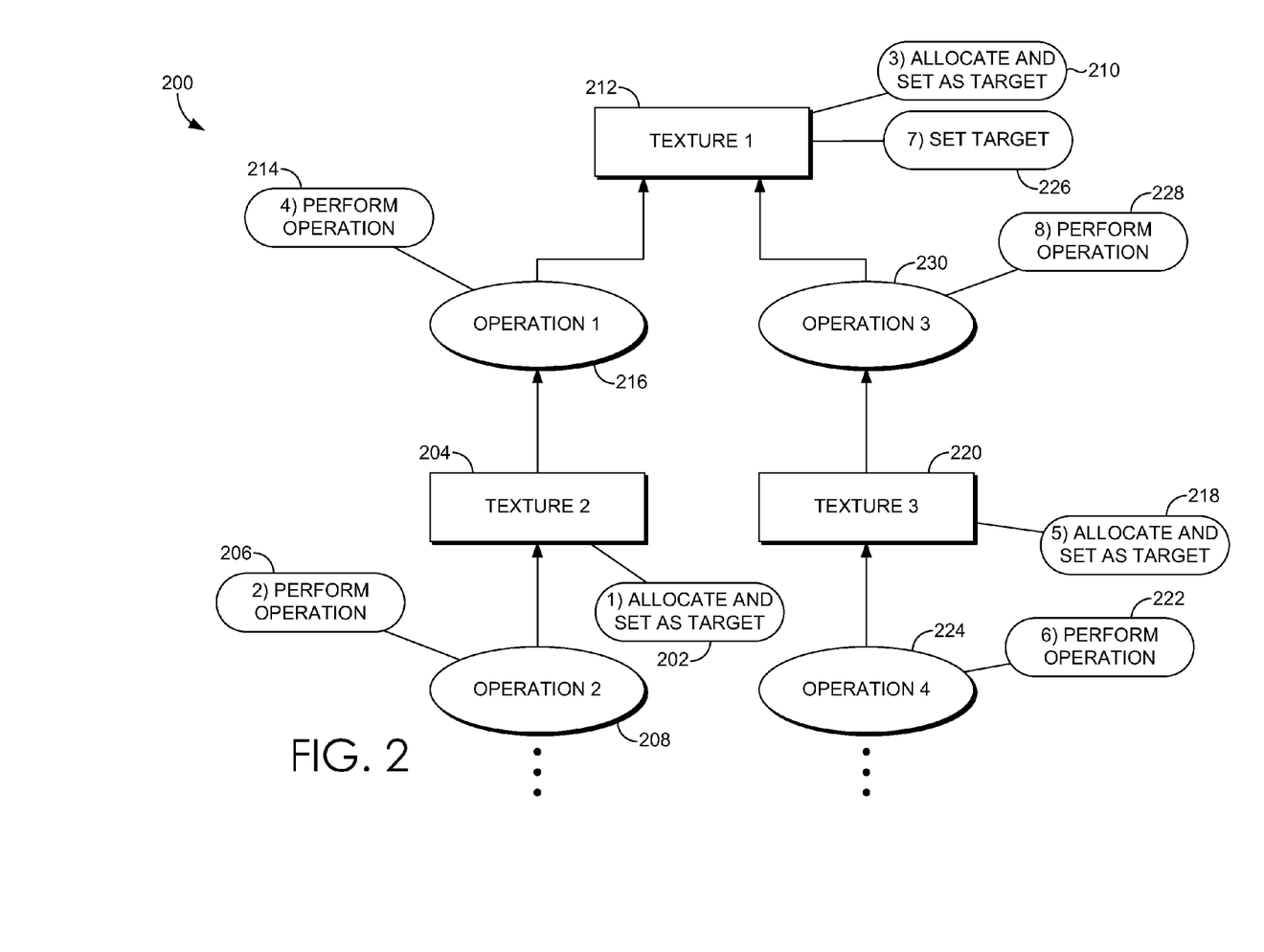
FIG. 2 is an effect graph illustrating an execution order.

Referring next to FIG. 2, an effect graph 200 is illustrated of an execution order. The execution order shown in FIG. 2 is typically the execution order of a standard depth-first graph. A depth-first graph is one in which the execution order switches back and forth between a final render target and intermediate render targets such that more flushes are forced (e.g., each time a render target is switched), but less memory is generally required with the more frequent flushes. Here, after all operations that use a certain texture as its input have been completed, the rendering system will automatically deallocate that texture such that by traversing through a graph in a depth-first order, such as that shown in FIG. 2, a rendering system can limit the memory usage required to render that graph. On tile-based graphic processing units (GPUs), there is a high fixed cost for flushing operations into a texture. This makes it desirable to render as many of the necessary operations into a texture as possible before a flush occurs, thereby limiting the number of flushes and total fixed costs. Flushes occur on tile-based GPUs in part, as a result of switching the texture that is set as the GPU's current render target. In FIG. 2, operation 1 (item 216) will be flushed in order to allow texture 3 (item 220) to become the GPU's new render target. Texture 1 (item 212) will ultimately be flushed twice, as operation 3 (item 230) will eventually need to be executed into texture 1 (item 212).

As shown in FIG. 2, operation 2 (item 208) writes pixels to texture 2 (item 204), whose pixels are read by operation 1 (item 216). Operation 1 (item 216) writes pixels to texture 1 (item 212). Operation 4 (item 224) writes pixels to texture 3 (item 220), whose pixels are read by operation 3 (item 230). Operation 3 (item 230), along with operation 1 (item 216) also writes pixels to texture 1 (item 212). In a standard depth-first graph, as shown here, operation 1 (item 216) would take place before operation 3 (item 230), and thus texture 1 (item 212) would be allocated in memory and set as a target twice—once for operation 1 (item 216) and once for operation 3 (item 230).

The first step is for texture 2 (item 204) to be allocated in memory and set as a render target, shown at step 202. Operation 2 (item 208) is performed or executed, shown at step 206. Texture 1 (item 212) is then allocated in memory and set as a render target, shown at step 210. Remaining on the same leg of the graph, operation 1 (item 216) is performed at step 214, and reads pixels from texture 2 (item 204) and writes pixels to texture 1 (item 212). Once one leg or side of the effect graph is complete, the next leg is started. As such, texture 3 (item 220) is allocated in memory and set as a render target at step 218, and operation 4 (item 224) is performed at step 222, writing pixels to texture 3 (item 220). Once again, for the second time, texture 1 (item 212) is set as a render target at step 226 so that operation 3 (item 230) can be performed at step 228. Ellipses are shown underneath operation 2 (item 308) and operation 4 (item 316) to indicate that other textures and operations may be included in the graph, but are not shown for simplicity purposes and ease of explanation.

Figure 3:
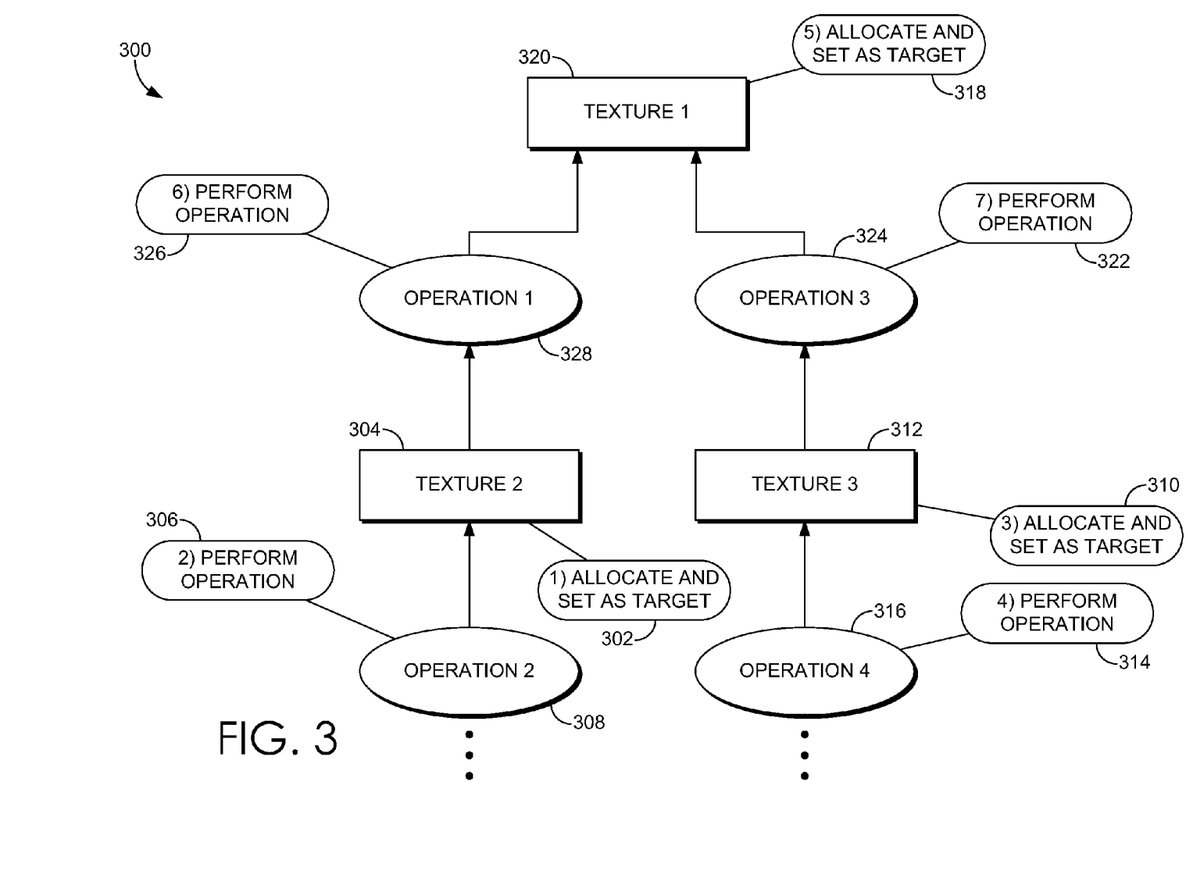
FIG. 3 is an effect graph illustrating a modified execution order, in accordance with an embodiment of the present invention.

FIG. 3 is an effect graph 300 illustrating a modified execution order, in accordance with an embodiment of the present invention. The main difference between FIG. 2 and FIG. 3 is the execution order. Note that texture 1 (item 320) is allocated in memory and set as a target only once at step 318, and it was done twice using the execution order shown in FIG. As will be described in more detail, this approach causes fewer flushes to occur, thus improving performance. The algorithm used may still be based on a depth-first traversal, in the sense that each operation's subgraph may be immediately traversed. The execution of each operation, however, is deferred until all subsequent operations that share the same target texture can also be executed (i.e., the textures from which the operations read have all been completely rendered).

As such, texture 2 (item 304) is allocated in memory and set as a render target at step 302. Operation 2 (item 308) is then performed at step 306. Prior to moving along the leg of the effect graph, texture 3 (item 312), which is parallel to texture 2 (item 304), is allocated in memory and set as a target at step 310. Operation 4 (item 316), which is parallel to operation 2 (item 308), is performed or executed at step 314. Next, either operation 3 (item 324) or operation 1 (item 328) is performed. The order in which these operations are performed may be determined one or more heuristics. For instance, the most recently deferred operation may be operated first. A similar heuristic may also be used in determining whether to execute operation 2 (item 308) or operation 4 (316) first. Next, texture 1 (item 320) is allocated in memory and set as a render target at step 318 such that both operation 1 (item 328) and operation 3 (item 324) can be executed and write pixels to texture 1 (item 320). Again, the benefit of reordering the execution of operations, as shown in FIG. 3, is so that texture 1 (item 320) is allocated and set as a render target only once, or at least less times than it would be if allocated when using the order shown in FIG. 2. This decreases overall costs, as each time a flush occurs, expenses are also incurred.

Figure 4:
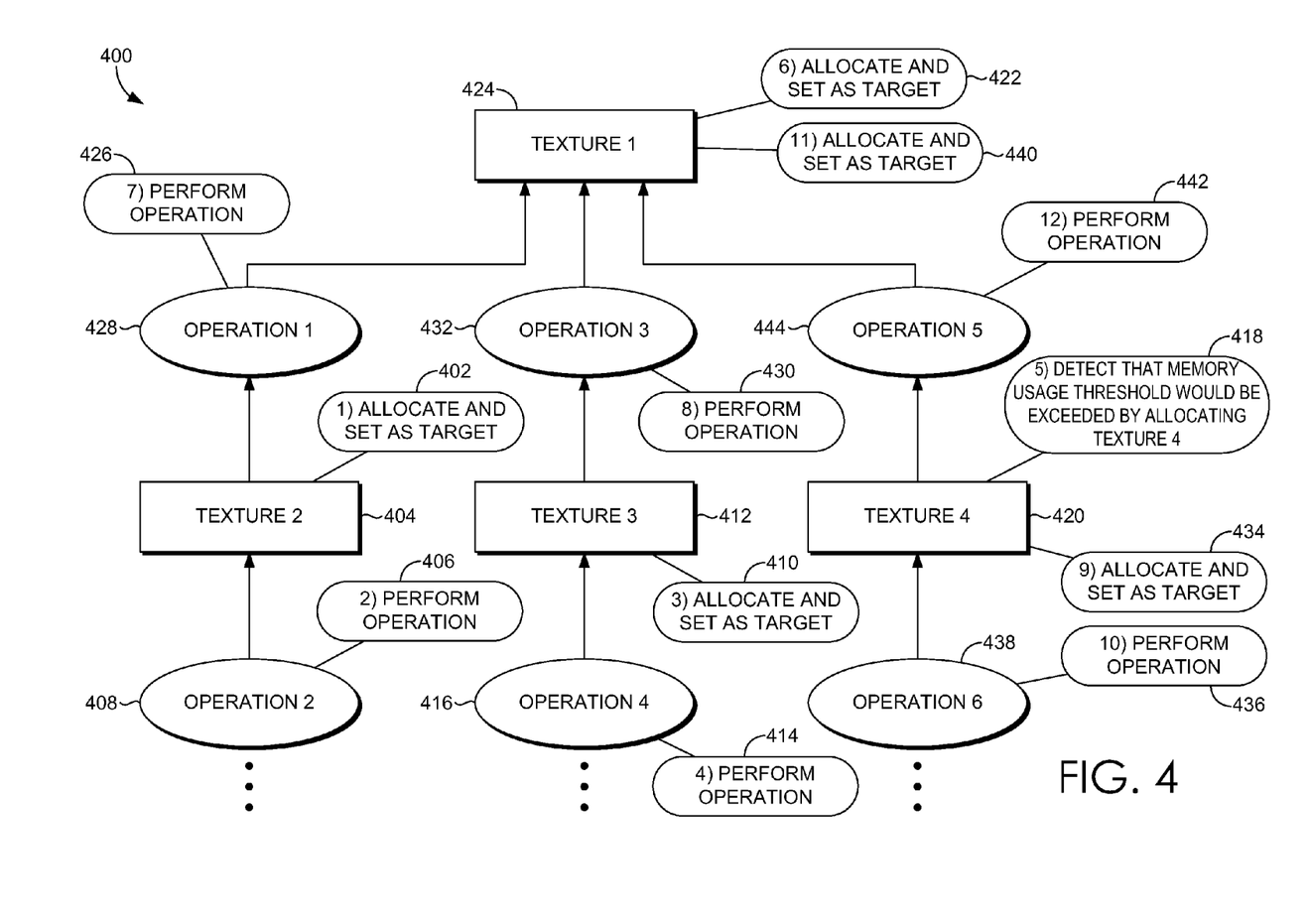
FIG. 4 is an effect graph illustrating a modified execution order, in accordance with an embodiment of the present invention.

FIG. 4 is an effect graph 400 illustrating a modified execution order, in accordance with an embodiment of the present invention. FIG. 4, like FIG. 3, illustrates a modified execution order such that texture 1 (item 424) is allocated and set as a target less times than the number of operations that write pixels to texture 1 (item 424). Here, the system automatically performs deferred operations once a certain memory usage threshold is met, causing some unnecessary flushes while reducing memory usage. Various heuristics may be used to decide when to execute deferred operations, and the order in which the operations are performed. For exemplary purposes only, a heuristic used may include a threshold for total texture memory usage may be used, or a threshold for only the extra amount of memory usage resulting from the deferred operation. The effect graph 400 illustrated in FIG. 4 uses a heuristic that includes a threshold for total texture memory usage, and is shown for exemplary purposes only. Here, the system detects that the threshold would be exceeded if texture 4 (item 420) were allocated, and thus begins unwinding deferred operations.

As mentioned, various heuristics are also used for deciding which deferred operations to execute first. In the diagram above, the system selects the most recently deferred operation, which is operation 3 (item 432). To execute it, the system first executes other deferred operations that share the same target texture, or texture 1 (item 424). After these are complete, the process may repeat and continue until memory usage has been reduced enough to allocate texture 4 (item 420) without exceeding the threshold.

Initially, texture 2 (item 404) is allocated and set as a render target at step 402. A render target, as used herein, is a piece of state on the GPU hardware that indicates which texture is to be written when drawing operations are sent to the GPU. Next, operation 2 (item 408) is performed at step 406. Instead of moving up the same leg of the execution graph, texture 3 (item 412), which is parallel to texture 2 (item 404), is allocated and set as a target at step 410 so that operation 4 (item 416) can be performed at step 414. Next, as shown at step 418, it is detected that the memory usage threshold would be exceeded by allocating texture 4 (item 420) at this time, as the allocation of texture 2 (item 404) and texture 3 (412) may have taken much of the available memory. At this time, operation 1 (item 428) and operation 3 (item 432) can be performed at steps 426 and 430, respectively, after texture 1 (item 424) is allocated and set as a render target at step 422.

A flush may now occur so that memory is available for allocating a setting as a render target texture 4 (item 420) at step 434. A flush may occur, in part, as a result of switching a texture that is set as a render target of the GPU. Prior to this step, it may have been determined that the memory usage threshold would not be exceeded by allocating texture 4 (item 420). Operation 6 (item 438) is performed at step 436. Texture 1 (item 424) is now allocated and set as a target again at step 440 so that operation 5 (item 444) can be performed at step 442 and so that it can write pixels to texture 1 (item 424). As shown here, texture 1 (item 424) is allocated and set as a render target less times as there are operations that write to that texture. Texture 1 (item 424) was allocated and set as a target twice, and there are three operations that write to texture 1 (item 424).

Figure 5:
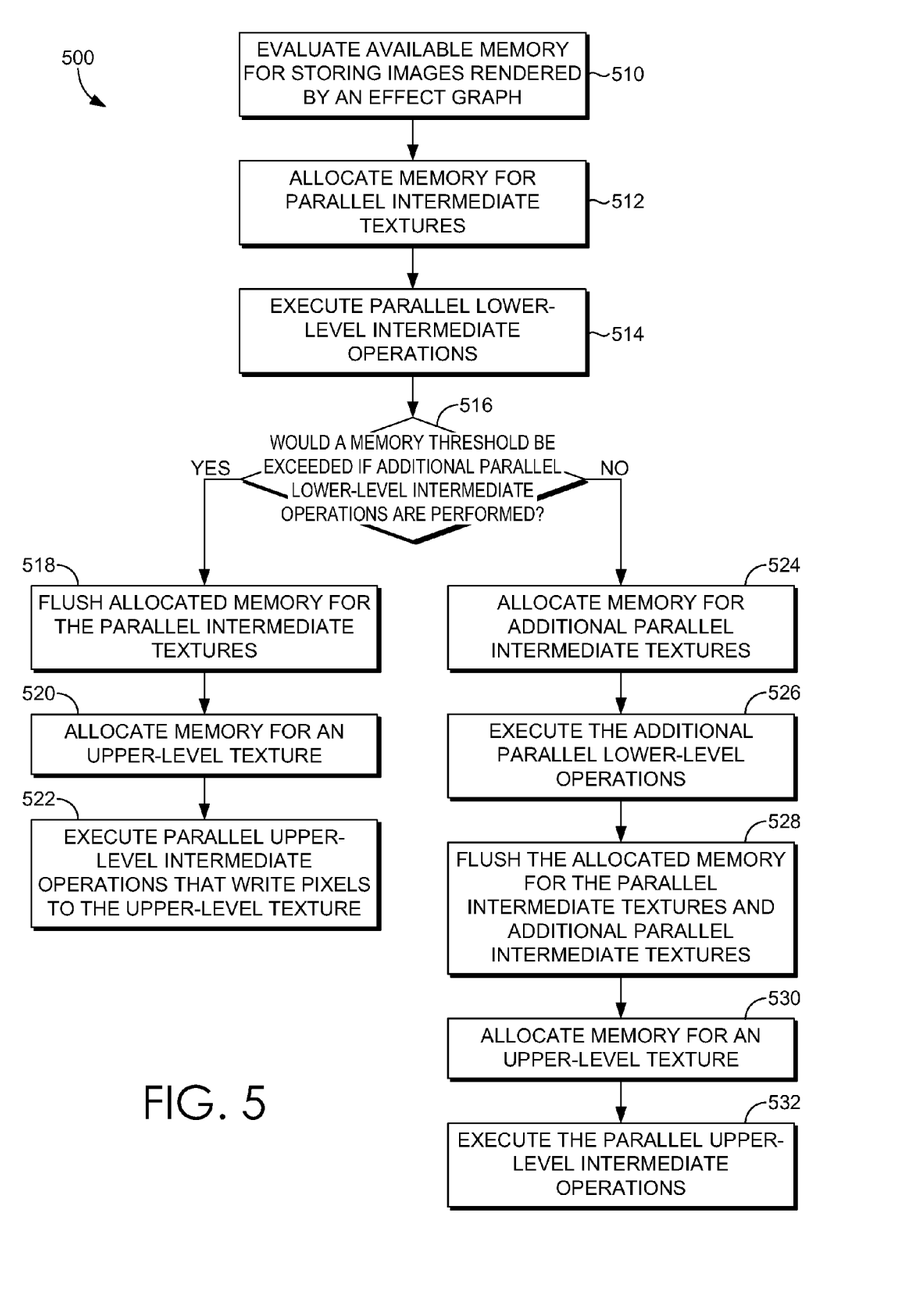
FIGS. 5-6 are a flow diagrams illustrating methods of reordering operations in execution of an effect graph by a graphics processing unit (GPU), in accordance with embodiments of the present invention.

Turning now to FIG. 5, a flow diagram illustrates a method 500 of reordering operations in execution of an effect graph by a GPU, in accordance with an embodiment of the present invention. Initially, available memory is evaluated for storing images rendered by an effect graph. At step 512, memory is allocated for two or more parallel intermediate textures. As used herein, an intermediate texture is a texture that is neither an input texture to the effect graph, nor is it the final output texture to the effect graph. Rather, it is a texture that is in between. Parallel textures are textures that each have operations further up in the effect graph that write pixels to the same texture. At high level, a texture is an object that contains one or more arrays of some dimensionality. Generally, as used herein, a texture stores one or more images that are processed by operations in the effect graph. For instance, a texture, in 3D graphics, may be a digital representation of the surface of an object. A texture may also represent two-dimensional qualities, such as color, brightness, etc. A texture may be encoded with three-dimensional properties, such as how transparent and reflective the object is. A texture, once defined, may be wrapped around a 3D object, commonly termed texture mapping. For example, in FIG. 4, for example, texture 2 (item 404), texture 3 (item 412) and texture 4 (item 420) are parallel to each other, as they each have an operation subsequent in the effect graph (operation 1 (item 428), operation 3 (item 432), and operation 5 (item 444), respectively) that writes pixels to the same texture, here texture 1 (item 424). While allocating memory for two or more parallel intermediate textures is shown as a single step, step 512, in some embodiments, this is actually more than one step such that a first parallel intermediate texture is allocated prior to a second parallel intermediate texture. The allocation may not occur simultaneously.

At step 514, two or more parallel lower-level intermediate operations are executed. These operations write pixels to the two or more parallel intermediate textures, and thus are lower-level operations. There may be more than one set of parallel lower-level intermediate operations, and as such steps 512 and 514 may be repeated multiple times. At step 514, each of the two or more parallel lower-level intermediate operations may be executed in sequence. In one embodiment, each of the two or more parallel lower-level intermediate operations are deferred until all of these operations can also be executed. In this embodiment may provide for fewer flushes during rendering of an upper-level image stored in the upper-level texture. At step 516, it is determined whether a memory threshold would be exceeded if additional parallel lower-level intermediate operations are performed. Here, the additional parallel lower-level intermediate operations may be parallel to the two or more lower-level operations have are executed in step 514. If it is determined that the memory threshold would be exceeded in an additional parallel lower-level intermediate operation is performed, the allocated memory for the parallel intermediate textures is flushed at step 518. In one embodiment, a flush also includes the GPU storing a list of operations comprising the effect graph and executing the list of operations when a predetermined threshold is met. A threshold may include, for instance, an amount of memory available for storing images in textures. Since the parallel lower-level intermediate operations have been executed at step 514 and the allocated memory has been flushed for the parallel intermediate textures at step 518, memory can now be allocated for an upper-level texture at step 520. In one embodiment, the upper-level texture is the final texture or the uppermost texture of the effect graph such that the final rendered image is stored in the upper-level texture. At step 522, the two or more parallel upper-level intermediate operations that write pixels to the upper-level texture are executed.

In one embodiment, once the two or more parallel upper-level intermediate operations are executed, the system may move back to the additional lower-level parallel intermediate operations, as now it would be expected that the memory threshold would not be exceed, as flushing has occurred. As such, the additional parallel texture may now be allocated to memory and set as a render target so that the additional lower-level parallel intermediate operations can be executed. It should be noted that while a texture being allocated to memory and set as a render target are typically described together, these are discrete operations. A texture may be set as the render target many different times, but may only be allocated to memory once, initially. Further, the final output texture may have been allocated at some point prior to that described herein, such as nearer to the initial input to the effect graph.

Returning to step 516 of FIG. 5, if it is determined that a memory threshold would not be exceeded if additional lower-level parallel intermediate operations are performed such that additional textures would be allocated to memory, memory is then allocated for the additional parallel intermediate textures at step 524. At step 526, the additional parallel lower-level operations are executed. The allocated memory for the parallel intermediate textures and the additional parallel intermediate textures can now be flushed, shown at step 528. At step 530, memory is allocated for the upper-level texture. An image stored in the upper-level texture is rendered by, at least, two or more parallel upper-level intermediate operations that read pixels from the images stored in the parallel intermediate textures. The parallel upper-level intermediate operations that write pixels to the upper-level texture are executed at step 532. As previously mentioned, the quantity of flushes decreased with a decrease in the quantity of times that textures are set as a render target. As such, a flush, in one embodiment, occurs each time a texture is allocated to the memory. In one embodiment, the GPU is a tile-based GPU that provides execution operations by dividing up rendering of a render target into smaller regions and executes operations to the smaller regions in parallel.

In one embodiment, the execution of the effect graph may be algorithmically reordered so that the two or more parallel lower-level intermediate operations occur sequentially and so that the upper-level texture is allocated to memory and set as a render target in fewer instances than a quantity of the two or more parallel lower-level intermediate operations. As such, if there are three parallel lower-level intermediate operations, the goal would be to have two or fewer flushes. The reordering, in one embodiment, is based on one or more heuristics that determine when additional memory required to perform the reordered effect graph justifies performance improvement on the GPU.

Figure 6:
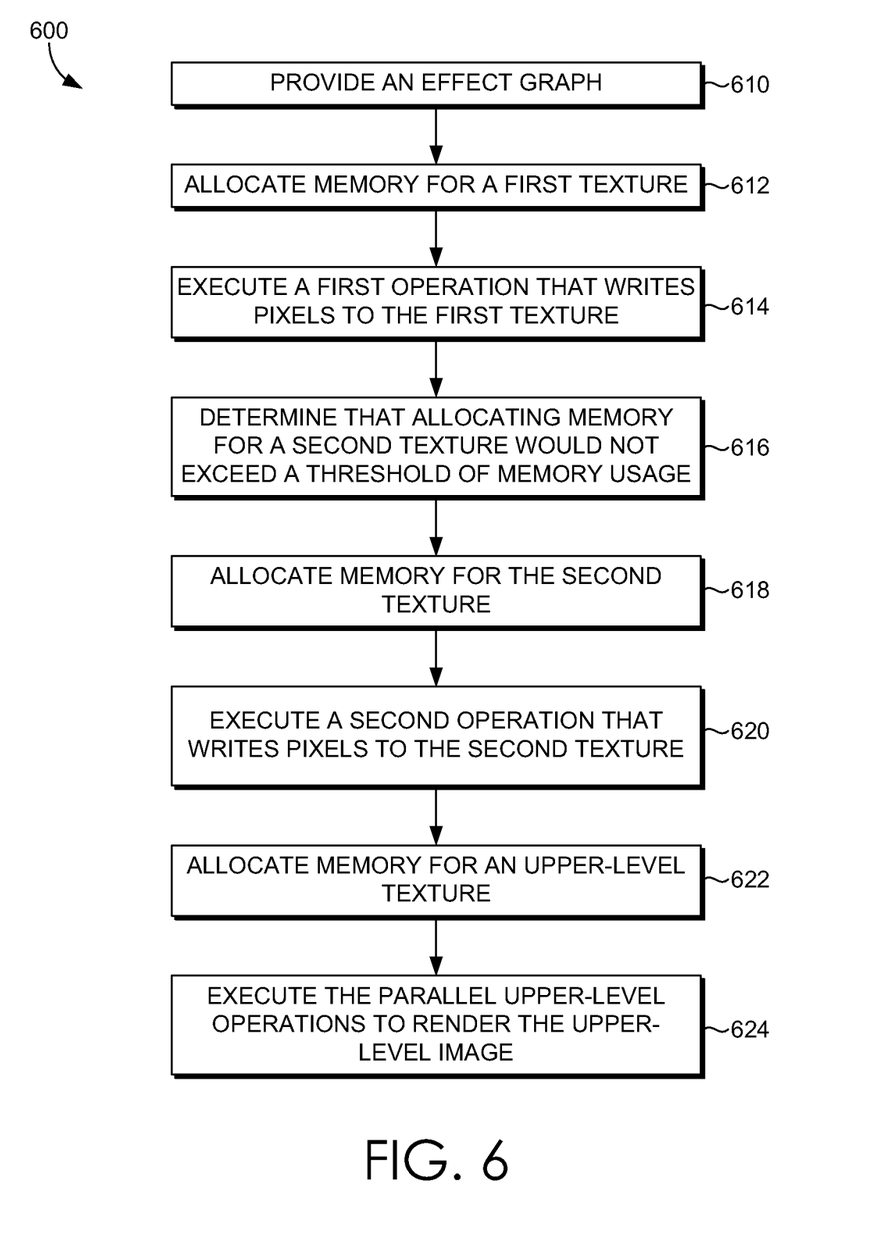

Referring to FIG. 6, a flow diagram is shown of a method 600 of reordering operations in execution of an effect graph by a GPU, in accordance with an embodiment of the present invention. Initially, an effect graph is provided at step 610. The effect graph comprises multiple operations used to render an image and multiple textures that store images. At step 612, memory is allocated for a first texture of two or more parallel textures. At step 614, a first operation is executed that writes pixels to the first texture. It is determined that allocating memory for a second texture would not exceed a threshold of memory usage, shown at step 616. At 618, memory is allocated for the second texture that is parallel to the first texture. At step 620, a second operation that writes pixels to the second texture is executed. Memory for an upper-level texture can then be allocated at step 622. The upper-level texture is rendered by two or more parallel upper-level operations that write pixels to the upper-level texture such that the upper-level texture is allocated in memory less times than the quantity of operations comprising the two or more upper-level operations. At step 624, the parallel upper-level operations are executed to render the upper-level image stored in the upper-level texture.

In one embodiment, it is further determined that allocating memory for a third texture of the two or more parallel textures would not exceed the threshold of memory usage. As such, memory is allocated for the third texture, and a third operation writes pixels to the third texture.

As can be understood, embodiments of the present invention provide action-based deeplinks for search results. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media devices having computer-executable instructions embodied thereon, that when executed by a computing system having a processor and memory, cause the computing system to perform a method of reordering operations in execution of an effect graph by a graphics processing unit (GPU), the method comprising:
    evaluating available memory for storage of images rendered using the effect graph;
    evaluating additional memory for storage of images rendered using a reordered effect graph;
    determining, based on evaluating the additional memory, that the additional memory needed to perform the reordered effect graph justifies performance improvement;
    allocating memory for two or more parallel intermediate textures when the additional memory needed justifies performance improvement;
    executing two or more parallel lower-level operations that write pixels to the two or more parallel intermediate textures, wherein after executing a first of the two or more parallel lower-level operations on a first texture of the two or more parallel intermediate textures, execution of an upper-level operation that reads pixels from the first texture and writes pixels to an upper-level texture is deferred for execution of a second of the two or more parallel lower-level operations on a second texture of the two or more parallel intermediate textures, the upper-level operation immediately following the first of the two or more parallel intermediate textures in the effect graph;
    determining that a memory threshold would be exceeded if additional lower-level parallel operations are performed;
    flushing the allocated memory for the two or more parallel intermediate textures;
    allocating memory for the upper-level texture, wherein an image stored in the upper-level texture is rendered using, at least, two or more parallel upper-level operations that read pixels from the images stored in the two or more parallel intermediate textures; and
    executing the two or more parallel upper-level operations that write pixels to the upper-level texture based on the determining that the memory threshold would be exceeded, wherein the executed two or more parallel upper-level operations include the deferred upper-level operation.

2. The computer storage media of claim 1, wherein each of the two or more parallel intermediate textures stores one or more images that are processed by operations in the effect graph.

3. The computer storage media of claim 1, wherein the upper-level texture is a final texture and as such stores a final image output of the effect graph.

4. The computer storage media of claim 1, wherein allocating memory for the two or more parallel intermediate textures and for the upper-level texture comprises setting the image stored in the texture as a render target.

5. The computer storage media of claim 4, wherein the render target is a piece of state on GPU hardware that indicates which texture is to be written when drawing operations are sent to the GPU.

6. The computer storage media of claim 1, wherein a quantity of flushes that occur is decreased from a standard depth-first execution order of the effect graph.

7. The computer storage media of claim 6, wherein a flush occurs, in part, as a result of switching a texture that is set as a render target of the GPU.

8. The computer storage media of claim 1, wherein the GPU is a tile-based GPU.

9. The computer storage media of claim 1, wherein the execution of each of the two or more parallel lower-level operations are deferred until all of the two or more parallel lower-level operations can also be executed.

10. The computer storage media of claim 9, wherein deferring execution until all of the two or more parallel lower-level operations are executable, provides for fewer flushes during rendering of an upper-level image stored in the upper-level texture.

11. The computer storage media of claim 9, further comprising using one or more heuristics to determine when to execute the two or more lower-level operations that have been deferred.

12. One or more computer storage media devices having computer-executable instructions embodied thereon, that when executed by a computing system having a processor and memory, cause the computing system to perform a method of reordering operations in execution of an effect graph by a graphics processing unit (GPU), the method comprising:

evaluating available memory for storage of images rendered using the effect graph;

evaluating additional memory for storage of images rendered using a reordered effect graph;

determining, based on evaluating the additional memory, that the additional memory needed to perform the reordered effect graph justifies performance improvement;

allocating memory for two or more parallel intermediate textures when the additional memory needed justifies performance improvement;

executing two or more parallel lower-level operations that write pixels to the two or more parallel intermediate textures, wherein execution of two or more parallel upper-level operations that read pixels from the two or more parallel intermediate textures and write pixels to an upper-level texture are deferred;

determining that a memory threshold would not be exceeded if additional lower-level parallel operations are performed;

allocating memory for additional parallel intermediate textures that are parallel to the two or more parallel intermediate textures;

executing the additional parallel lower-level operations that write pixels to the additional parallel intermediate textures, wherein execution of an upper-level operation that reads pixels from one of the additional parallel intermediate textures and writes pixels to the upper-level texture is deferred, the upper-level operation being parallel to the two or more parallel upper-level operations;

flushing the allocated memory for the two or more parallel intermediate textures and for the additional parallel intermediate textures;

allocating memory for the upper-level texture, wherein an image stored in the upper-level texture is rendered by, at least, the two or more parallel upper-level operations and the upper-level operation that read pixels from the images stored in the two or more parallel intermediate textures and the additional parallel intermediate textures; and executing the two or more parallel upper-level operations and the upper-level operation that write pixels to the upper-level texture.

13. The media of claim 12, wherein executing the two or more parallel lower-level operations that write pixels to the two or more parallel intermediate textures is performed upon deferring executing until each of the two or more parallel lower-level operations of the two or more parallel intermediate textures that render in parallel the upper-level texture are executable.

14. The media of claim 12, wherein the GPU is a tile-based GPU that provides execution operations by dividing up rendering of a render target into smaller regions and executes operations to the smaller regions in parallel.

15. The media of claim 12, wherein a flush occurs each time a texture is allocated to the memory.

16. The media of claim 15, wherein the flush further includes the GPU storing a list of operations comprising the reordered effect graph and executing the list of operations when a predetermined threshold is met.

17. The media of claim 15, further comprising algorithmically reordering the execution of the effect graph so that the two or more parallel lower-level operations occur sequentially and so that the upper-level texture is allocated to memory and set as a render target in fewer instances than a quantity of the two or more parallel lower-level operations.

18. The media of claim 17, further comprising determining, based on evaluating the additional memory, that the additional memory needed to perform the reordered effect graph does not justify the performance improvement such that the rendering is performed using the effect graph.

19. A method in a computing environment utilizing a processor and memory for reordering operations in execution of an effect graph by a graphics processing unit (GPU), the method comprising:

providing an effect graph comprising a plurality of operations used to render an image and a plurality of textures that store images and a final image;

providing a reordered effect graph comprising a reordered plurality of operations used to render the image and the plurality of textures that store images and the final image;

evaluating available memory for storage of images rendered using the effect graph;

evaluating additional memory for storage of images rendered using a reordered effect graph;

determining, based on evaluating the additional memory, that the additional memory needed to perform the reordered effect graph justifies performance improvement, wherein performance improvement is determined based at least in part on minimizing a number times a flush is executed to change a render target;

allocating memory for two or more parallel intermediate textures when the additional memory needed justifies performance improvement;

executing a first operation of the two or more parallel lower-level operations that writes pixels to the first texture;

determining that allocating memory for a second texture of the two or more parallel textures would not exceed a threshold of memory usage;

deferring execution of an upper-level operation that reads pixels from the first texture and writes pixels to an upper-level texture for execution of a second operation that writes pixels to the second texture, wherein the upper-level operation immediately follows the first operation in the effect graph;

allocating memory for the second texture of the two or more parallel textures;

executing the second operation of the two or more parallel lower-level operations that writes pixels to the second texture;

allocating memory for the upper-level texture that is rendered by two or more parallel upper-level operations that write pixels to the upper-level texture such that the upper-level texture is allocated in memory less times than the quantity of operations comprising the two or more parallel upper-level operations; and executing the two or more parallel upper-level operations that read pixels from the two or more parallel textures to render an upper-level image stored in the upper-level texture, wherein the executed two or more parallel upper-level operations include the deferred upper-level operation.

20. The method of claim 19, further comprising:

determining that allocating memory for a third texture would not exceed the threshold of the memory usage;

allocating memory for the third texture; and executing a third operation that writes pixels to the third texture.

* * * * *